H. SCHNEEBELI.
EXHAUST BOX.
APPLICATION FILED NOV. 29, 1919.
1,401,368.
Patented Dec. 27, 1921.
3 SHEETS—SHEET 1.
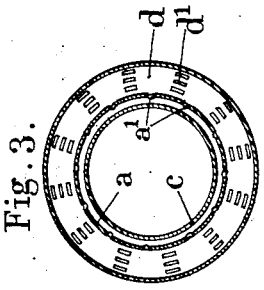
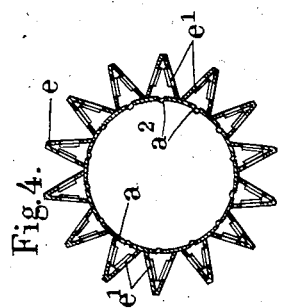
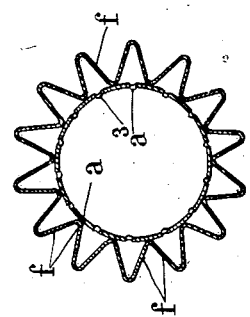
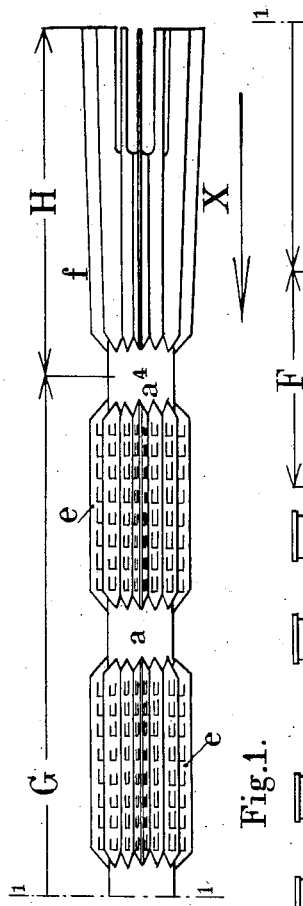
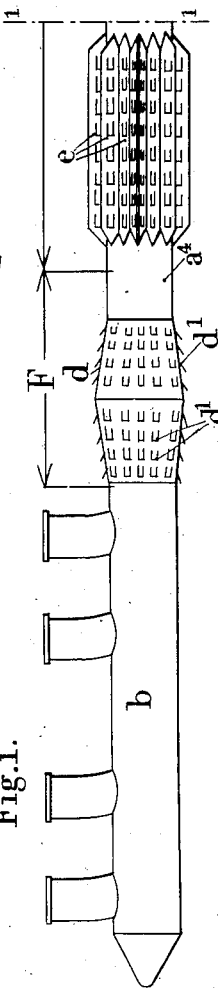
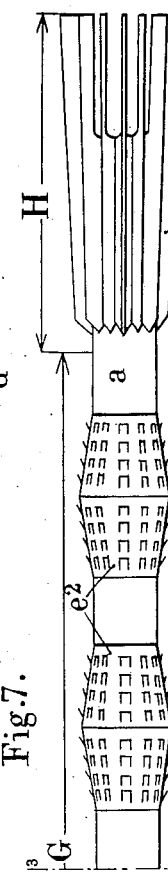
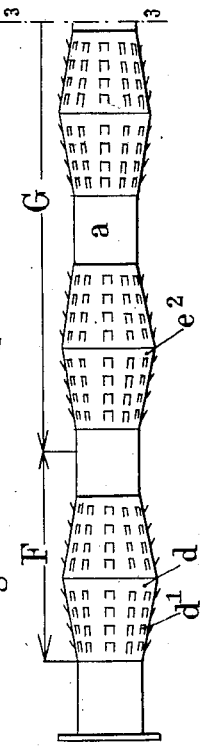
Inventor:
Hugo Schneebeli
per H. W. Plucker
Attorney.

H. SCHNEEBELI.
EXHAUST BOX.
APPLICATION FILED NOV. 29, 1919.
1,401,368.
Patented Dec. 27, 1921.
3 SHEETS—SHEET 2.
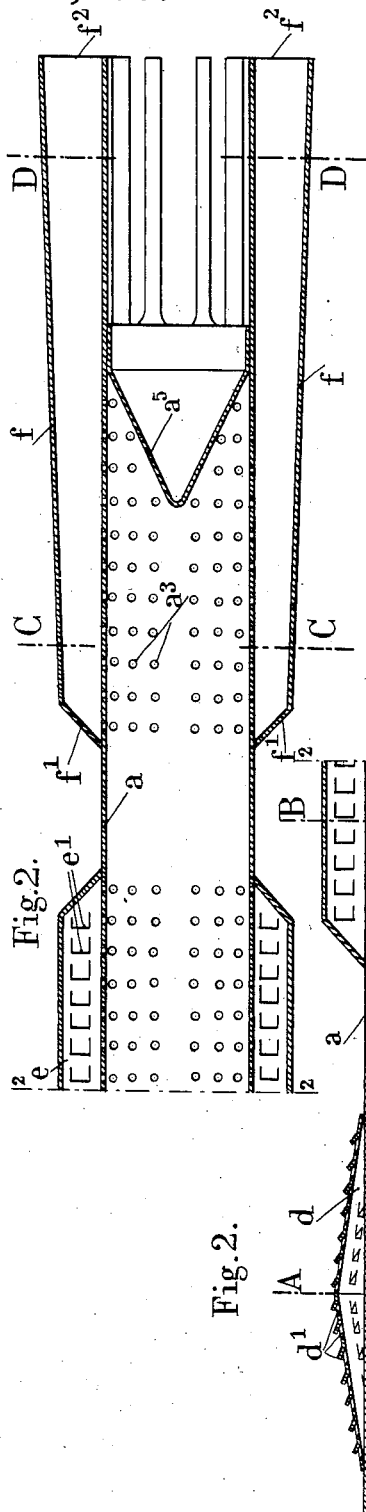
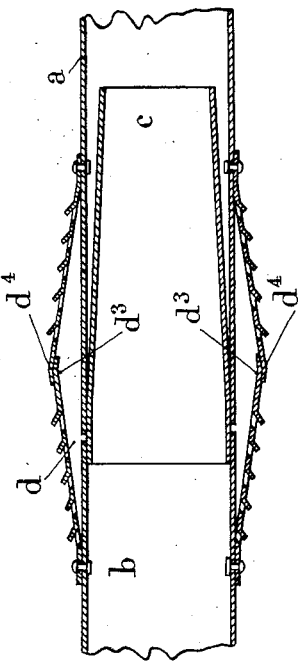
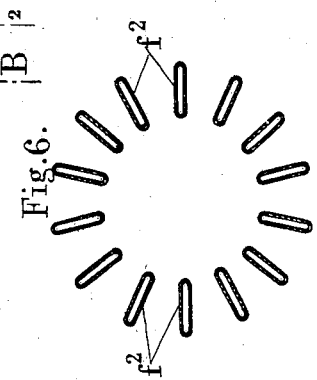
Inventor:
Hugo Schneebeli
per H. W. Plucker
Attorney.

H. SCHNEEBELI.
EXHAUST BOX.
APPLICATION FILED NOV. 29, 1919.
1,401,368.
Patented Dec. 27, 1921.
3 SHEETS—SHEET 3.
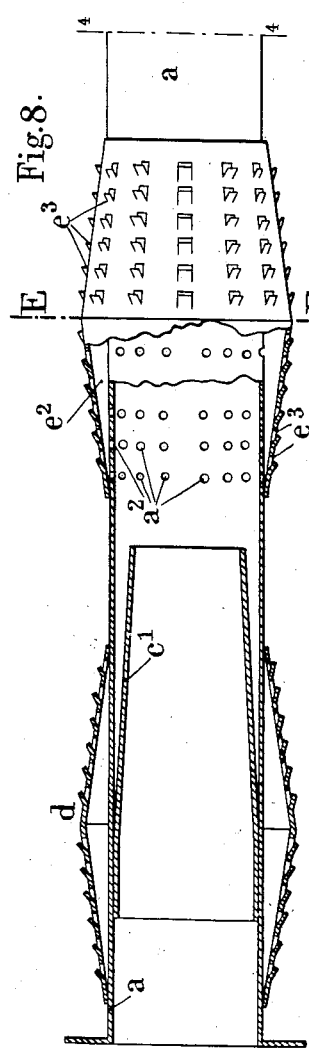
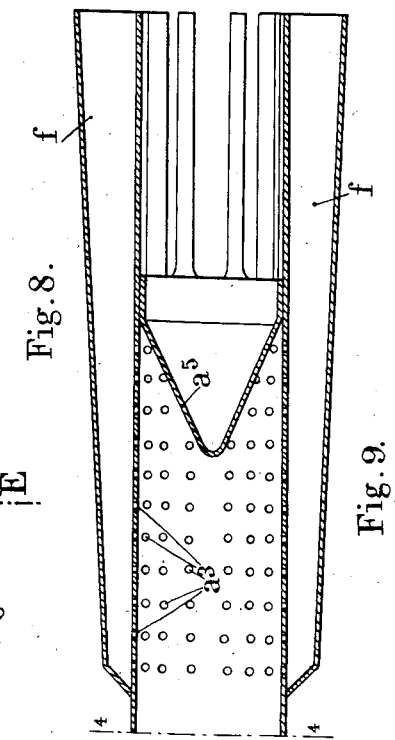
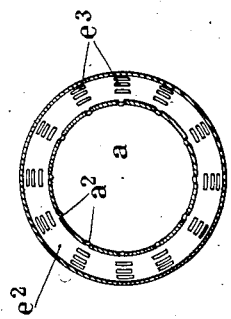
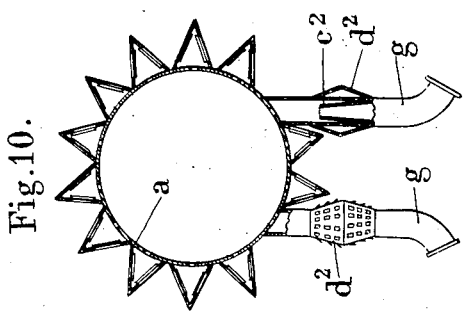
*Inventor:*
*Hugo Schneebeli*
per *H. W. Plucker*
*Attorney.*

UNITED STATES PATENT OFFICE.

HUGO SCHNEEBELI, OF COURBEVOIE, FRANCE.

EXHAUST-BOX.

1,401,368.

Specification of Letters Patent. Patented Dec. 27, 1921.

Application filed November 29, 1919. Serial No. 341,514.

(GRANTED UNDER THE PROVISIONS OF THE ACT OF MARCH 3, 1921, 41 STAT. L., 1313.)

*To all whom it may concern:*

Be it known that I, HUGO SCHNEEBELI, of 28 Rue de Bécon, Courbevoie, Seine, France, engineer, have invented an Exhaust-Box, (for which I have filed applications in France Nov. 18, 1918, Patent Number 500,596 of 1919; Oct. 22, 1918, Patent Number 500,509 of 1919,) of which the following is a full, clear, and exact description.

With the exhaust boxes fitted up to now to internal combustion engines for the purpose of reducing the noise caused by explosions, the result sought for is usually only imperfectly obtained. If the devices used prevent, to a certain extent, the perception of the noise, they generally produce a back-pressure very prejudicious to the efficiency of the motor.

Moreover, when these apparatus are used with high power motors, aeroplane motors for instance, they have a very serious disadvantage from the fact that they do not prevent the issue of the flames which thus permit of following, at night, the aeroplane in its flight.

The present invention has for its object an exhaust box for explosion motors in general, but more particularly devised in view of its application to aircraft, completely remedying the above mentioned disadvantages.

This exhaust box is essentially characterized by the fact that it comprises three distinct zones or portions connected together, viz.:

1°. A first zone, directly connected to the exhaust of the motor, in which is produced the re-ignition of the unburnt gases coming from the motor.

2°. A second zone formed by a series of gas diffusion or division chambers, in which a notable portion of the burnt gases is discharged without noise in the atmosphere and without egress of flame.

3°. A third zone comprising a gas cooling chamber, insuring the complete discharge of the burnt gases and producing a cooling and division of these gases so high that their total discharge is insured without noise and without production of flames.

The re-ignition zone of unburnt gases substantially comprises a conical nozzle acting as gas injector, arranged in the exhaust branch for these gases. The discharge of the gases through this injector produces, in the first portion of the apparatus, the entrance of air from the atmosphere, which spontaneously ignites the unburnt gases when they issue from the injector.

The gas diffusion chambers, forming the second portion of the apparatus, essentially consist in a series of hollow ribs or gills, arranged all around the gas outlet tube and forming chambers communicating with this outlet tube; the faces of these various chambers being perforated with openings insuring the silent issue of the burnt gases in the form of thin sheets and preventing the issue of the flames.

The gas cooling chamber is constituted by a series of tubes communicating at one of their ends with the inlet branch of the gases and opening freely in the atmosphere. These tubes are carried only on a portion of their length by the gas inlet branch; the greater part of the length of these tubes is free from attachment and is constantly in contact with the surrounding air incessantly renewed by reason of the displacement of the apparatus.

It results therefrom that the gas streams leaded in the series of tubes of relatively small cross section, are subjected to a continuous and energetic cooling and issue from these tubes at a sufficiently low temperature preventing them from being ignited when discharged.

Various methods of carrying this invention into practice are illustrated in the accompanying drawings in which:

Figure 1 is a front elevation of an exhaust box made according to this invention.

Fig. 2 is a longitudinal vertical section on an enlarged scale, of the various constitutive elements of the exhaust box shown in Fig. 1.

Figs. 3 to 6 are cross vertical sections made respectively on lines A—A, B—B, C—C and D—D of Fig. 2.

Fig. 7 is a front elevation of a second form of execution.

Fig. 8 is a longitudinal vertical section of the essential elements of the exhaust box shown in Fig. 7.

Fig. 9 is a cross vertical section made on line E—E of Fig. 8.

Fig. 10 illustrates a modification in the construction of the exhaust box.

Fig. 11 is a longitudinal vertical section of a special arrangement of the air inlet chamber leading to the gas injector.

Referring more particularly to Figs. 1 to 6, it will be seen (Fig. 1) that the present exhaust box essentially comprises three portions or zones F. G. H arranged one after the other and in which are successively and respectively effected:

1°. The re-ignition of the unburnt gases driven off by the motor,

2°. The cooling, diffusion and silent dispersion in the atmosphere, of a notable portion of the burnt gases, 3°. The total discharge of the burnt gases remaining in the apparatus, these gases being led outside in the form of thin streams canalized and cooled in such a manner as to prevent the formation of flames at the outlet of the apparatus.

The exhaust box having the above mentioned characteristic features substantially comprises a branch $a$ of suitable length and cross section, directly connected to the gas exhaust branch $b$ of the motor and internally provided, at the place where it is connected to the branch $b$, with a conical nozzle $c$ serving as gas injector.

The branch $a$ is, moreover, provided outwardly and at the level of the injector, with a chamber $d$ adapted to allow the entrance of the air from the atmosphere into the branch $a$, around the injector $c$, for producing the spontaneous ignition of the unburnt gases driven off by the motor and entering into the branch $a$ through the injector $c$.

For that purpose, the chamber $d$ is provided with openings $d^1$ preferably formed by tongues cut out in the walls of this chamber and suitably raised for facilitating the entrance of the air in the chamber $d$ during the displacement of the apparatus in the atmosphere. The interior of this chamber $d$ is, on the other hand, in constant communication with the tube $a$ through the openings $a^1$ in the latter.

On the branch $a$ and beyond the injector $c$ are arranged hollow cooling ribs or gills $e$ constituting gas diffusion and division chambers communicating with the branch $a$ through the openings $a^2$ in the latter. The faces of the cooling ribs or gills forming the chambers $e$ are perforated with openings $e^1$ also formed by tongues cut out in the gills and suitably raised for allowing the air from the atmosphere, circulating on the surface of the gills during the displacement of the apparatus, to produce through the openings $e^1$ in the gills the suction of the burnt gases circulating in the branch $a$ and their silent discharge in the atmosphere.

As will be seen in the drawings, these chambers $e$ for the cooling and discharge of the burnt gases, constituting the zone G of the apparatus, are arranged about the entire periphery of the branch $a$ which may be provided with a suitable number of series of these chambers, according to the applications.

The last zone H of the exhaust box in which is produced the discharge of the burnt gases remaining in the branch $a$, substantially comprises a series of tubes $f$ of any suitable cross section, connected on a portion of their length only to the rear end of the central branch $a$ closed by a conical bottom $a^5$.

These tubes $f$, which communicate with the tube $a$ throughout the length of the portion connected to branch $a$, are closed at their front end $f^1$.

They are extended beyond the branch $a$ so as to constitute, in their rear portion, tubes free from any attachment with this branch $a$ and to permit a free circulation of air between them, thus insuring an energetic cooling of the tubes and of the gases circulating in the latter.

The rear ends of the exhaust tubes $f$ are provided with an opening $f^2$ of reduced section, insuring the division of the gases in thin sheets at their point of discharge, the lowering of the temperature of these gases during their passage in the tubes $f$, preventing the production of flames through the outlet openings $f^2$ of these tubes.

Figs. 7 to 9 illustrate a second form of execution of the exhaust box, differing from that above described simply by the special arrangement of the zone G, in which are produced the diffusion and the division in thin sheets or streams of the burnt gases and the discharge of a notable portion of these gases in the atmosphere.

Referring to Figs. 7 and 8, it will be seen that this exhaust box comprises, as in the first case, a central gas inlet branch $a$ carrying, at the inlet end, a gas injector formed as above by a conical nozzle $c^1$.

Beyond this injector, cooling chambers $e^2$ are arranged at intervals and in suitable number on the branch $a$ with which the interior of these chambers is in constant communication through the openings $a^2$ of this branch $a$.

Each of these chambers $e^2$ is constituted, in this second embodiment, by two truncated cones assembled on their large base and fixed at their small base on the branch $a$.

The walls of these chambers, which constitute circular cooling ribs or gills, are perforated with openings $e^3$ obtained by cutting out, in these walls, tongues suitably raised or bent for allowing the air successively circulating on the opposite faces of these gills, during the displacement of the apparatus, to produce through the openings $e^3$ in these gills the suction of the burnt gases circulating in the branch $a$ and their silent discharge in the atmosphere.

The exhaust box above described with reference to Figs. 7 to 9 is completed by a bundle of tubes $f$ similar to that described in the first form of execution (Figs. 1 to 6).

In the modification (Fig. 10), the exhaust box comprises a branch $a$ in which open the inlet tubes $g$, connected to the motor, for the exhaust gases.

Each of these tubes $g$ is provided with a gas injector formed, as in the previously described arrangements, of a conical base $c^2$, as well as a chamber $d^2$ permitting the entrance of the atmospheric air in the branch $a$ and the re-ignition of the unburnt gases driven off by the motor into each of the branches $g$.

In certain cases, for instance in the arrangement illustrated in Fig. 1, in which the exhaust box is subjected to vibrations different from those of the motor, the body of the branch $a$ is carried by collars surrounding the latter at $a^4$, $a^4$ and for fitting up the injecting cone $c$ and the air inlet chamber $d$, the device illustrated in Fig. 11, may be used.

In this case, the large bases of each of the conical portions of this chamber are not connected the one to the other. They are provided each with a spherical seat $d^3$, $d^4$ fitting freely in one another so as to thus constitute a ball joint; one of the conical portions forming the front part of the chamber $d$ is fixed, in this case, to the exhaust gas inlet tube $b$ directly connected to the motor and the rear part of this chamber $d$ is secured on the branch $a$.

The operation of this apparatus is as follows:

Suppose the exhaust box is fitted to an aeroplane flying in the direction indicated by the arrow X, the air from the atmosphere enters, by reason of the movement of this aeroplane, in the chamber $d$ through its openings $d^1$.

The gas driven off by the motor enters violently in the branch $a$, passing through the injector $c$ and producing, through the openings $a^1$ of the branch $a$, the drawing in of the air entering into the chamber $d$.

If the whole of these gases is not entirely burnt, or if a sudden reduction of speed of the motor corresponding to an important emission of unburnt gases takes place, the fresh atmospheric air coming in contact with these hot, unburnt gases produces the spontaneous ignition of these gases as soon as they issue from the injector.

The products of the combustion then circulate within the branch $a$.

Their silent discharge without egress of flames to the exterior is obtained in the zone G in the following manner:

By reason of the rapid movement of the aeroplane in the atmosphere, the air passes over the entire outer surface of the chambers $e$; it results therefrom a partial vacuum at the outlet orifices $e^1$ of each of them, thus drawing the products of combustion of the branch $a$ into each of the chambers $e$, then to the exterior through the openings $e^1$ of each of them.

The multiplicity of the openings $a^2$ of the branch $a$ and of the openings $e^1$ of each chamber $e$ produces on the one hand, the division of the gases into thin and numerous jets which are cooled by their passage in the chambers $e$ and insure, on the other hand, by reason of this division, their silent discharge.

The outside propagation of the flames is also avoided by means of the arrangement of the openings $a^2$ and $e^1$ which act on said flames as a metallic network and prevent the outside re-ignition of the cooled and unburnt gases.

The gases remaining in the branch $a$, beyond the zone G are forced, by reason of the conical bottom $a^5$ of this branch, to pass, through the openings $a^3$, in the bundle of tubes $f$, from which they are discharged outside through the openings $f^2$ in the form of thin jets; the temperature of these burnt gases being sufficiently lowered, during their passage in the bundle of tubes $f$, for preventing the re-ignition, at the outlet, of the unburnt portions which may still exist in the body or mass of the exhaust gases.

From the foregoing, it will be seen that the various actions which are successively produced in the zones F, G and H of the apparatus, insure the total and silent issue of the exhaust gases of the motor, without production or egress of flames to the outside, the unburnt gases being spontaneously ignited in contact with the atmospheric air drawn into the central branch by the issue through the injector of the gases driven off by the motor; any issue or outside production of flames is rendered impossible in the middle zone G by the action of the atmospheric air which, passing over the faces of the cooling chambers and sucking a notable portion of the burnt gases, extinguishes those which might be eventually sucked in through the openings of these chambers; the gases remaining in the central branch are finally discharged in the atmosphere through outlet openings, of reduced cross section, of a bundle of tubes constantly cooled by the surrounding air, so as to sufficiently lower the temperature of the gases for preventing their re-ignition at the outlet orifices of the bundle of tubes.

The above described constructional arrangements are, of course, given only by way of example and it is obvious that several injectors might be arranged one after the other and that the number of gas cooling and diffusion chambers might also be varied according to the application, without departing thereby from the nature of the invention.

Claims—

1. An exhaust box for explosion motors, insuring the noiseless discharge of the gases from the motor without producing prejudicious back-pressure and preventing any egress or outside production of flames, essentially constituted by: (a) a gas inlet branch suitably perforated at its periphery and directly connected to the exhaust branch of the motor; (b) one or more gas injectors comprising one or more air inlet chambers for producing the re-ignition of the unburnt gases driven off by the motor; (c) a series of burnt gas diffusion and division chambers insuring the cooling of these gases and producing the silent discharge of a notable portion of the said gases into the atmosphere without outside production of flames; (d) a bundle of independent tubes arranged at the rear end of the gas inlet branch and adapted to produce such a cooling of the burnt gases that their discharge through the outlet openings of the bundle of tubes is effected without producing flames.

2. An exhaust box for explosion motors, insuring the noiseless discharge of the gases from the motor without producing prejudicious back-pressure and preventing any egress or outside production of flames, comprising: (a) a gas injector constituted by a conical nozzle at the entrance of the gas inlet branch, the said gas inlet branch being outwardly provided with a chamber the walls of which are perforated with openings allowing the entrance of the air into this chamber and into the gas inlet branch with which the said chamber is in constant communication through openings of the said branch, the admission of atmospheric air producing the re-ignition of the unburnt gases; (b) diffusion chambers constituted by hollow gills having no direct communication with each other and arranged about the inlet branch and communicating with the latter, the faces of the hollow gills being perforated for the purpose of allowing the divided and cooled combustion products being discharged in the form of thin sheets, these combustion products being outwardly drawn or sucked by the air passing over the outer faces of the hollow gills; (c) a bundle of independent tubes formed of a series of tubes supported only on a portion of their length by the gas inlet branch and communicating at this portion with the said branch, the other portion of the length of these tubes being free from attachment so as to be subjected on all their faces to the cooling action of the surrounding air, the issue of the gases being effected through the rear end of the said tubes which present an opening of reduced cross-section.

3. In an exhaust box for the engines of vehicles and the like, diffusion chambers comprising two truncated conical casings joined at their large bases and surrounding a central pipe of the exhaust box, said casings communicating directly with the central pipe, and having in their walls openings so arranged that the motion of the vehicle will cause the external air to advance the exhaust gases through the central pipe toward the discharge end thereof.

The foregoing specification of my exhaust box signed by me this 7th day of November, 1919.

HUGO SCHNEEBELI.

In the presence of—
HENRY T. WILCOX.